June 12, 1934.   L. GESS   1,962,769
FLOW METER
Filed Jan. 26, 1931   2 Sheets-Sheet 1
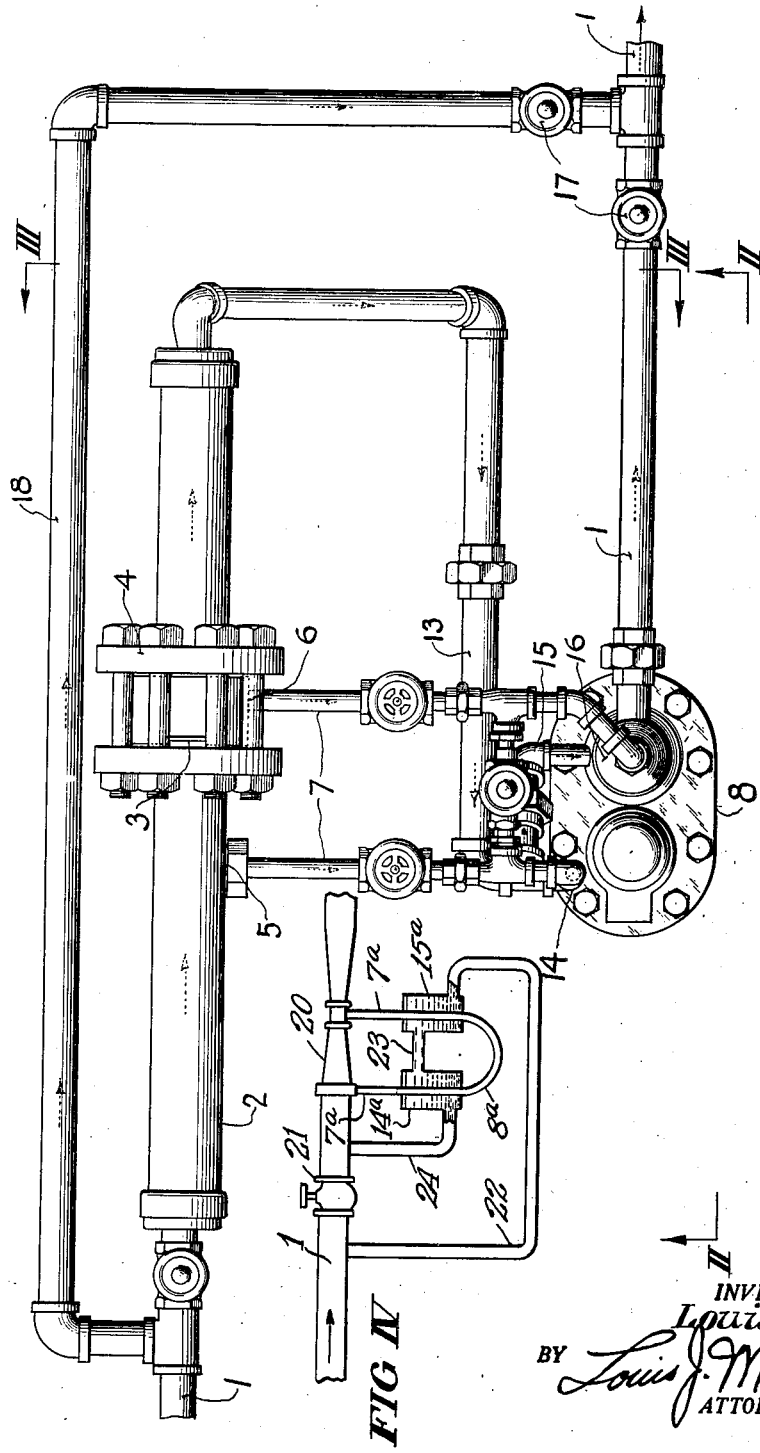

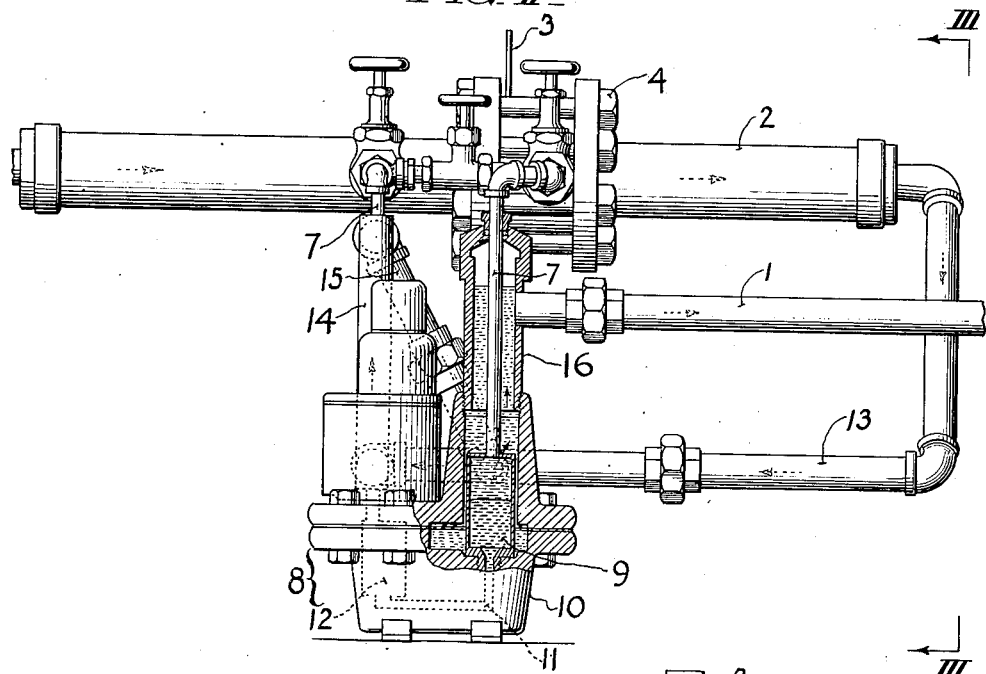
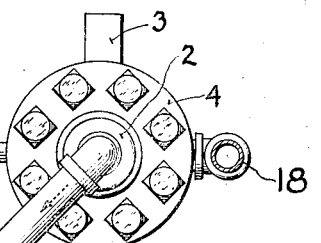
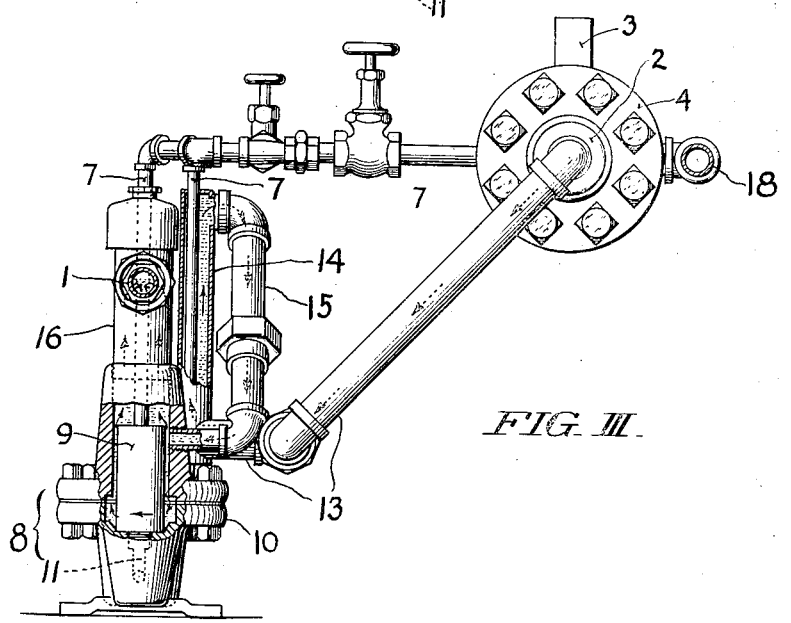

Patented June 12, 1934

1,962,769

UNITED STATES PATENT OFFICE 1,962,769

FLOW METER

Louis Gess, Jenkintown, Pa., assignor to The Brown Instrument Company, Philadelphia, Pa., a corporation of Pennsylvania Application January 26, 1931, Serial No. 511,358

4 Claims. (Cl. 73—167)

This invention relates to flow meters.

It is frequently desirable to measure the flow of oil or other fluids where the instrument would be exposed to extreme weather conditions; for example, in an oil refining plant heated oil is frequently conducted from one point to another and the flow metered by a gauge unprotected from the weather. In such installations it is difficult to obtain a satisfactory response of the pressure gauge to the change in differential pressure due to changes in flow because the fluid in the conduits leading from the oil line to the pressure gauge becomes, in winter time, extremely cold, and where the fluid is oil or like liquid it becomes highly viscous and very sluggish in its movements in response to changes in differential pressure. Accordingly, the transmission of the differential pressure to the gauge does not follow accurately the changes in differential pressure in the line of flow and the flow meter readings are correspondingly inaccurate.

Heretofore it has been the practise to provide steam coils for heating the conduits leading from the oil line to the pressure gauge which will keep the fluid in those conduits in a mobile state. It is frequently inconvenient to supply steam and of course it is an added expense to so heat the conduits and the manometer.

It is the object of this invention to provide for heating the manometer and the conduits associated therewith by the hot oil being metered. Other objects and advantages will appear in the following detailed description taken in connection with the accompanying drawings.

Fig. 1 is a plan view of the flow meter assembly.

Fig. 2 is a view in elevation of the line II—II of Fig. 1, the manometer being partly broken away and in section.

Fig. 3 is a view of line III—III of Fig. 1, with parts broken away and shown in section.

Fig. 4 is a diagrammatic elevation illustrating a modified modification of the apparatus shown in Figs. 1–3.

The oil line 1 through which the oil passes in the direction indicated by the arrows, is provided with an enlargement 2 to accommodate the orifice plate 3 connected into the enlargement 2 by the flanged couplings 4. The flow of oil through the orifice plate 3 creates a differential pressure at the points of connection 5 and 6 of the conduits 7 with the enlarged section 2. The conduits 7 serve to transmit the different pressures to the manometer.

The manometer 8 is provided with a low pressure chamber 9 which consists of a hollow plug screwed into the base 10 of the manometer and joined by passage 11 to a high pressure chamber 12 formed in the body of the manometer. One conduit 7 leads to the low pressure chamber 9 and the other conduit 7 leads to the high pressure chamber 12.

In order to provide for a suitable transfer of heat to the fluid contained within the conduits 7 and associated parts of the pressure gauge, the hot oil being metered is conducted through pipe 13 into the jacket 14 surrounding the high pressure conduit 7 where it gives up a portion of its heat to the conduit 7 and fluid therein. From the jacket 14 the hot oil is conducted by pipe connections 15 into jacket 16 surrounding the low pressure conduit 7 and associated part of the manometer to heat those portions of the meter. From the jacket 16 the oil is passed on to the line 1.

Suitable valves 17 and a by-pass 18 may be provided, if desired, for by-passing the oil around the flow meter.

As described, the entire flow of the metered oil passes in heat transfer relation with the pressure transmitting connections between the manometer and the orifice plate assembly, however, it is obvious that if desired, a small portion only of the hot oil may be by-passed into such heat transfer relation with the flow meter. Obviously also, the supply of oil for heating the manometer may be taken from the main line before the oil reaches the orifice plate rather than after, if desired. The invention is in no way limited to the particular type of manometer employed, nor to the particular type of pressure differential creating means; for example, a Venturi tube may be employed in place of the orifice plate. Thus, for example, as illustrated diagrammatically in Fig. 4, such portion of the hot oil or other fluid metered as may be needed to heat the differential pressure measuring means is withdrawn from and returned to the main conduit 1 through pipes 22 and 24 respectively, both of which are connected to the conduit 1 at the inlet side of the Venturi section 20 therein employed to create a flow measuring pressure differential. In Fig. 4 the manometer 8a is shown as a simple U-tube the upper ends of the two legs of which constitute pressure transmitting connections 7a connected to high and low pressure points of the Venturi section 20. The pipe 22 passes oil into a jacket 15a surrounding one of the manometer tube legs. From the jacket 15a the oil passes through a connection 23 to a second jacket 14a surrounding the other manometer tube legs. From the jacket 14a the oil is transferred back to the conduit 1 through a pipe 24. The pipes 22 and 24 are connected to the conduit 1 at the high and low pressure sides respectively of a flow obstructing device 21 shown as a simple throttle valve. When the latter is closed all of the metered oil is passed through the pipes 22 and 24 and jackets 14a and 15a. When the valve 21 is partly open a portion of the metered oil, varying with the extent of valve opening, is passed through the pipes 22 and 24 and the jacket spaces 14a and 15a connecting those pipes. While the invention has been described as used in connection with hot oil, it is obvious that it may be used equally well with other heated fluids where conditions render its use necessary or desirable.

Having described my invention, what I claim now is as follows:

1. A flow meter having means for creating a pressure differential in the flowing medium which is a measure of the flow, a manometer, liquid filled conduits for transmitting the different pressures to the manometer, means for passing metered fluid in heat transfer contact relation with the outer walls of liquid filled portions of said conduits and manometer.

2. A flow meter having means for creating a pressure differential in the flowing medium which is a measure of the flow, a manometer, liquid filled conduits for transmitting the different pressures to the manometer, jackets for said conduits, pipe connections for passing metered fluid through said jackets in heat transfer relation with the liquid contained in said conduits.

3. A flow meter having means for creating a pressure differential in the flowing medium which is a measure of the flow, a U-tube manometer, liquid filled conduits for transmitting the different pressures to the legs of the manometer, means for passing metered fluid in heat transfer contact relation with the outer walls of said conduits and legs.

4. Apparatus for measuring the flow of hot oil through a conduit comprising differential pressure measuring means including oil filled pressure transmitting connections, and means for passing the hot oil metered along and in contact with the outer walls of said connections and thereby heating said connections and reducing the viscosity of the oil in said connections.

LOUIS GESS.